United States Patent Office 3,003,004
Patented Oct. 3, 1961

3,003,004
LONG CHAIN ALKENYL CHLORIDES
Thomas E. Lesslie, St. Albans, W. Va., and Robert J. O'Neill, Stoneham, Mass., assignors to Monsanto Chemical Company, St. Louis, Mo., a corporation of Delaware
No Drawing. Filed June 21, 1954, Ser. No. 438,342
6 Claims. (Cl. 260—654)

The present invention relates to the manufacture of long chain organic chlorine containing compounds. More particularly, the invention relates to the manufacture of unsaturated long chain chlorides in which the chlorine radical is highly reactive and readily replaceable by other groups. In the more specific examples of the invention as hereinafter set forth, when olefin fractions from the acid catalyzed polymerization of propylene are employed, such as propylene trimer, propylene tetramer, and propylene pentamer, and are chlorinated by our preferred procedure, the resulting products are describable as polypropenyl chlorides or alkenyl chlorides.

The chlorination step mentioned above may be carried out by any desired means but preferably should be so chosen that mainly halogen substitution rather than halogen addition occurs. Moreover the degree of halogenation should be such that to as great an extent as possible, mono-chlorination takes place. Consequently it is more desirable in our process to employ hypochlorous acid as the chlorinating agent due to greater ease in control of the reaction and to the nature of the product produced. However chlorine itself may, if desired, be employed as is described in the following example.

EXAMPLE 1

A propylene polymer (either propylene trimer, propylene tetramer or propylene pentamer, or a mixture of any or all of the polymers) is charged to an enclosed reactor with a quantity of a solvent itself incapable of chlorination, such as carbon tetrachloride. Light must, of course, be excluded from the reactor to as great an extent as possible to prevent an undesirable substitution reaction. Additionally the reactor should be equipped with agitation and also be jacked to allow circulation of temperature controlling means. Additionally a reflux condenser is attached to the reactor. After the polymer-solvent mix has been well agitated and cooled to a temperature of from 0–10° C., the required weight of chlorine (on a mole for mole basis) is slowly added to the mix at such a rate that the temperature does not rise above the maximum point mentioned. During the reaction hydrogen chloride is produced as a by-product and escapes through the condenser. Upon completion of the reaction, the solvent is removed by distillation and the residue washed with water until acid free. The product, which is mainly a polymerized propylene monochloride is thereby obtained.

EXAMPLE 2

A preferred method of producing our desired type of product, however, and one subject to greater ease of control, employs preformed hypochlorous acid and omits a solvent. In this procedure, hypochlorous acid in required molar quantity is added at a slow rate or in small portions, to a propylene polymer in a suitable reactor (as described in the previous example) with agitation and while maintaining a temperature of from 0–10° C. The mixture is allowed to separate into layers and the top layer washed at least twice with water. The product, mainly a monochlor-propylene polymer, is light yellow in color when first prepared but darkens after a few hours standing. However, there appears to be no change in chemical properties or reactivity of the product following the color change.

EXAMPLE 3

Another procedure of producing our new type product is that wherein the hypochlorous acid is produced in situ. In suitable acid resistant equipment, supplied with externally applied cooling means, temperature recording means, agitation, and an auxiliary acid containing vessel, the required weight of a propylene polymer and sodium hypochlorite solution (in substantially equal molar weight proportions) are added. The temperature of the agitated mix was then cooled to substantially 0° C. Thereupon hydrochloric acid was slowly added at a rate such that the temperature was maintained at between 0° and 10° C. After substantially an equal molar weight of the acid had been added in the manner set forth, agitation was continued under the imposed temperature limits mentioned for a short period of time for example, for from 30–60 minutes and then allowed to settle. Thereupon the bottom layer, mainly a salt solution, was withdrawn from the reactor, and the top layer was washed two or more times with water until free from salt and free acid. The resulting product, consisting as in the previous examples, mainly of polymerized propylene monochloride, is then dried by any conventional method. If desired, it can be distilled, preferably under partial vacuum without decomposition.

A number of alkenyl chlorides prepared by any of the methods described, but preferably by the last example shown are shown below in tabular form. The type of propylene polymer employed is indicated by the carbon atom content. Other experimental limits imposed are evident.

*Table I*

| Olefin | Moles Cl per mole of Olefin | Temp. Range, degrees | Refractive Index of product at 25° C. | Percent Chlorine | |
|---|---|---|---|---|---|
| | | | | Found | Calc. |
| $C_{12}$ | 1.6 | 0–25 | 1.4669 | 23.5 | 24.1 |
| $C_{12}$ | 1.0 | 0–10 | 1.4580 | 17.8 | 18.3 |
| $C_{12}$ | 1.6 | 20–25 | 1.4570 | 17.5 | 18.3 |
| $C_{14}$ | 1.0 | 0–10 | 1.4600 | 13.7 | 14.0 |
| $C_{14}$ | 1.6 | 0–10 | 1.4697 | 21.05 | 20.8 |
| $C_{14}$ | 2.0 | 0–10 | 1.4742 | 24.58 | 24.0 |
| $C_{16}$ | 1.0 | 0–10 | 1.4675 | 12.2 | 12.2 |
| $C_{16}$ | 1.6 | 0–10 | 1.4758 | 19.6 | 19.5 |

In all the examples in the table with the exception of that in line 6, the hypochlorous acid was formed in situ as shown in the third example described. In the results shown in line 6, Table I, preformed hypochlorous acid, as described by the example in Example 2 was employed. In the figure in the table shown for calculated chlorine content, the calculation was based on the weight increase and assumed that an alkenyl chloride was formed. It is quite evident that the results obtained fully confirm this assumption.

Provided then that mild chlorination procedures are employed, such as are described in the examples shown, a preponderance of mono chlorinated olefin is obtained in the product. For instance by fractionation under 1 mm. pressure of a product prepared by use of a 1:1 mole ratio of chlorine to olefin by the sodium hypochlorite-hydrochloric acid method at 0–10° C., we have determined that a minimum content of 79% monochloride is present. While some dichlorination may and does take place, a higher proportion of the mono chlorinated product results from a chlorine-olefin ratio of slightly less than 1.

The examples set forth should be considered as illustrative only and not in any sense limitative as to the scope of our invention. Changes in the time and temperature of the reaction may be made as well as variation in the proportions of the various reactants. Our invention is to be considered as limited in scope solely by the scope of the hereinafter set forth claims wherein it is our purpose to claim all novelty inherent in our process.

As was mentioned previously, a characteristic feature of the alkenyl or poly propenyl chlorides produced by the various methods set forth, is their utility in serving as starting materials for the manufacture of various products containing substituents in long carbon chains. Long chain amines and polyamines which are more particularly described in a co-pending application Serial No. 438,341, filed June 21, 1954, and now abandoned and which are of value as surfactants, as agricultural chemicals and the like may, as one example, be readily obtained by reacting an alkenyl chloride with a primary or secondary aliphatic polyamine.

What we claim is:

1. The process of producing a chloroolefin containing reactive chlorine which comprises reacting a higher olefin fraction from the acid catalyzed polymerization of propylene the average chain length of which falls within the range of 9–16 carbon atoms with hypochlorous acid in a ratio of approximately 1–2 moles of hypochlorous acid per mole of higher olefin and isolating a chloroolefin containing reactive chlorine.

2. The process of producing a chloropropylene polymer containing reactive chlorine which comprises reacting a higher olefin fraction from the polymerization of propylene the average chain length of which falls within the range of 12–16 carbon atoms with hypochlorous acid in a ratio of approximately 1–2 moles of hypochlorous acid per mole of higher olefin and isolating a chloroolefin containing reactive chlorine.

3. The process of producing a chloropropylene polymer containing reactive chlorine which comprises reacting a higher olefin fraction from the polymerization of propylene the average chain length of which falls within the range of 12–16 carbon atoms with hypochlorous acid at a temperature within the range of about 0° C. to 25° C. in a ratio of approximately 1–2 moles of hypochlorous acid per mole of higher olefin and isolating a chloroolefin containing reactive chlorine.

4. The process of producing chlorotetrapropylene polymer containing reactive chlorine which comprises reacting propylene tetramer with hypochlorous acid at a temperature between 0° C. and 10° C. in a ratio of approximately 1–2 moles of hypochlorous acid per mole of propylene tetramer.

5. The process of producing chlorotetrapropylene polymer containing reactive chlorine which comprises agitating a mixture of propylene tetramer and sodium hypochlorite solution said mixture containing no more than two atoms of chlorine per mole of tetramer, at a temperature below 10° C., adding hydrochloric acid thereto while maintaining the aforesaid temperature and separating the product.

6. The process of producing chlorotetrapropylene polymer containing reactive chlorine which comprises reacting substantially equimolecular proportions of propylene tetramer, sodium hypochlorite and hydrochloric acid under controlled temperature conditions.

References Cited in the file of this patent

UNITED STATES PATENTS

| | | |
|---|---|---|
| 1,253,615 | McElroy | Jan. 15, 1918 |
| 2,380,500 | Buc et al. | July 31, 1945 |
| 2,551,639 | Feasley et al. | May 8, 1951 |
| 2,592,977 | Towle | Apr. 15, 1952 |
| 2,658,929 | Ladd | Nov. 10, 1953 |
| 2,667,508 | Towle et al. | Jan. 26, 1954 |
| 2,777,883 | Chambers et al. | Jan. 15, 1957 |

OTHER REFERENCES

Strauss et al., Berichte, vol. 63 (1930), pp. 1868–85 (page 1879 relied on).

Chemical Abstracts, vol. 30, page 7097, abstracting an article by Kroeger et al. in J. Org. Chem., vol. 1, page 163 (1939).

Huntress, "Organic Chlorine Compounds," Wiley & Sons, Inc., New York (1948), page 1366.